United States Patent [19]

Itoh

[11] Patent Number: 5,535,315
[45] Date of Patent: Jul. 9, 1996

[54] GRAPHIC COLORING SYSTEM IN A GRAPHIC-DISPLAY SYSTEM HAVING SEPARATELY STORED SHAPE/POSITIONAL DATA AND COLOR DATA SELECTIVELY COMBINABLE TO FORM DESIRED IMAGES OF DIFFERING SHAPES AND COLORS

[75] Inventor: Yasunari Itoh, Yamato, Japan

[73] Assignee: PFU Limited, Kahoku, Japan

[21] Appl. No.: 104,090

[22] PCT Filed: Dec. 18, 1992

[86] PCT No.: PCT/JP92/01651

§ 371 Date: Aug. 13, 1993

§ 102(e) Date: Aug. 13, 1993

[87] PCT Pub. No.: WO93/12504

PCT Pub. Date: Jun. 24, 1993

[30] Foreign Application Priority Data

Dec. 18, 1991 [JP] Japan .................. 3-334893

[51] Int. Cl.⁶ .................. G06T 11/60
[52] U.S. Cl. .................. 395/131; 395/132
[58] Field of Search .................. 395/131–132, 395/162

[56] References Cited

U.S. PATENT DOCUMENTS 5,059,955 10/1991 Yamamura .................. 340/701
5,204,664 4/1993 Hamakawa .................. 340/703

FOREIGN PATENT DOCUMENTS 58-072990 5/1983 Japan .
63-237172 10/1988 Japan .
63-262686 10/1988 Japan .
63-304384 12/1988 Japan .

OTHER PUBLICATIONS

Foley, et al. "Computer Graphic Principles & Practices" ADDISON–WESLEY CO. 1990 pp. 584–595.

Primary Examiner—Heather R. Herndon
Assistant Examiner—Rudolph J. Buchel
Attorney, Agent, or Firm—Staas & Halsey

[57] ABSTRACT

A graphic display system has a display unit, a main memory for storing graphic data and a controller for controlling the processing and transferring of data between the display unit and the main memory. The main memory includes a correspondence table of luminance and color resource identifiers (IDs), image data based on color resource IDs, luminance-pixel position data, luminance-color data and combinational data of luminance-pixel position and luminance-color data. Differing images having either the same shape and different colors or the same color and different shapes are produced, according to the combinational data.

4 Claims, 13 Drawing Sheets

Fig.10A

| Color resource ID | Luminance |
|---|---|
| XX | L(X) |
|  |  |
| ¦ | ¦ |
|  |  |

Fig.10B

Prior art

| Color resource ID | R | G | B |
|---|---|---|---|
| XX | x | y | z |
|  |  |  |  |
| ¦ | ¦ | ¦ | ¦ |
|  |  |  |  |

| R(L)= | $a_R \cdot L + b_R$ |
|---|---|
| G(L)= | $a_G \cdot L + b_G$ |
| B(L)= | $a_B \cdot L + b_B$ |

Fig.12

| $R_1$ | $G_1$ | $B_1$ |
|---|---|---|
| $R_2$ | $G_2$ | $B_2$ |
| | | |
| $R_i$ | $G_i$ | $B_i$ |
| | | |
| $R_n$ | $G_n$ | $B_n$ |

GRAPHIC COLORING SYSTEM IN A GRAPHIC-DISPLAY SYSTEM HAVING SEPARATELY STORED SHAPE/POSITIONAL DATA AND COLOR DATA SELECTIVELY COMBINABLE TO FORM DESIRED IMAGES OF DIFFERING SHAPES AND COLORS

BACKGROUND OF THE INVENTION

The present invention relates to a graphic coloring system for displaying color images, stored in a main memory, on a display unit and more particularly, to a method of storing a large amount of image data in a minimum space in the main memory and displaying and coloring the images on the display unit, at high speed.

DESCRIPTION OF THE PRIOR ART

Computer graphic display systems are used in various fields, such as graphics editing, child education, and interior design systems that require accurate combinations of colors. The graphic display systems basically employ a CPU serving as a control unit to provide various instructions, an image memory (VRAM) for temporarily storing image data, a main memory for storing tables indicating relationships between image data and color data, a CRT serving as a display unit, and input units such as a keyboard and a mouse.

The main memory stores color images which are displayed and colored on the display unit. The color images occupy a large space in the main memory. To reduce the size of the main memory, it is necessary to provide a system that is capable of storing various images in a small memory space and speedily displaying and coloring the images on the display unit.

SUMMARY OF THE INVENTION

The present invention provides a graphic coloring system for a graphic display system. The graphic display system at least has a display unit, a main memory for storing graphic data, and a controller for controlling the processing of data and the transfer of data between the display unit and the main memory.

The main memory stores a correspondence table of luminance and color resource IDs, image data based on color resource identifiers (IDs), luminance-position data of each pixel, luminance-color (RGB) data of each pixel, and combinational data of the luminance-position and luminance-color data.

The graphic coloring system changes combinations of the shapes and colors of images, according to combinational data, to speedily provide optional images having the same shape and different colors, or the same color and different shapes.

The luminance-position data of each pixel indicates the luminance of each position on a gray scale. The luminance-color data of each pixel involves linear functions that define relationships between color data R, G, and B and luminance levels. When a piece of luminance-position data is given, corresponding color data is obtainable according to one of the linear functions. For each level of luminance, values of colors R, G, and B are prepared in advance. If the correspondence table of luminance and color resource IDs does not contain proper color resource IDs, they are added to the table.

BRIEF DESCRIPTION OF THE DRAWINGS

FIGS. 10A and 10B are correspondence tables of luminance and color resource IDs;

FIGS. 12 explain other luminance-color data; and

DESCRIPTION OF THE PREFERRED EMBODIMENT(S)

Before explaining embodiments of the present invention, a prior art and the problems thereof will be explained with reference to FIGS. 1 to 4.

Figure 1:
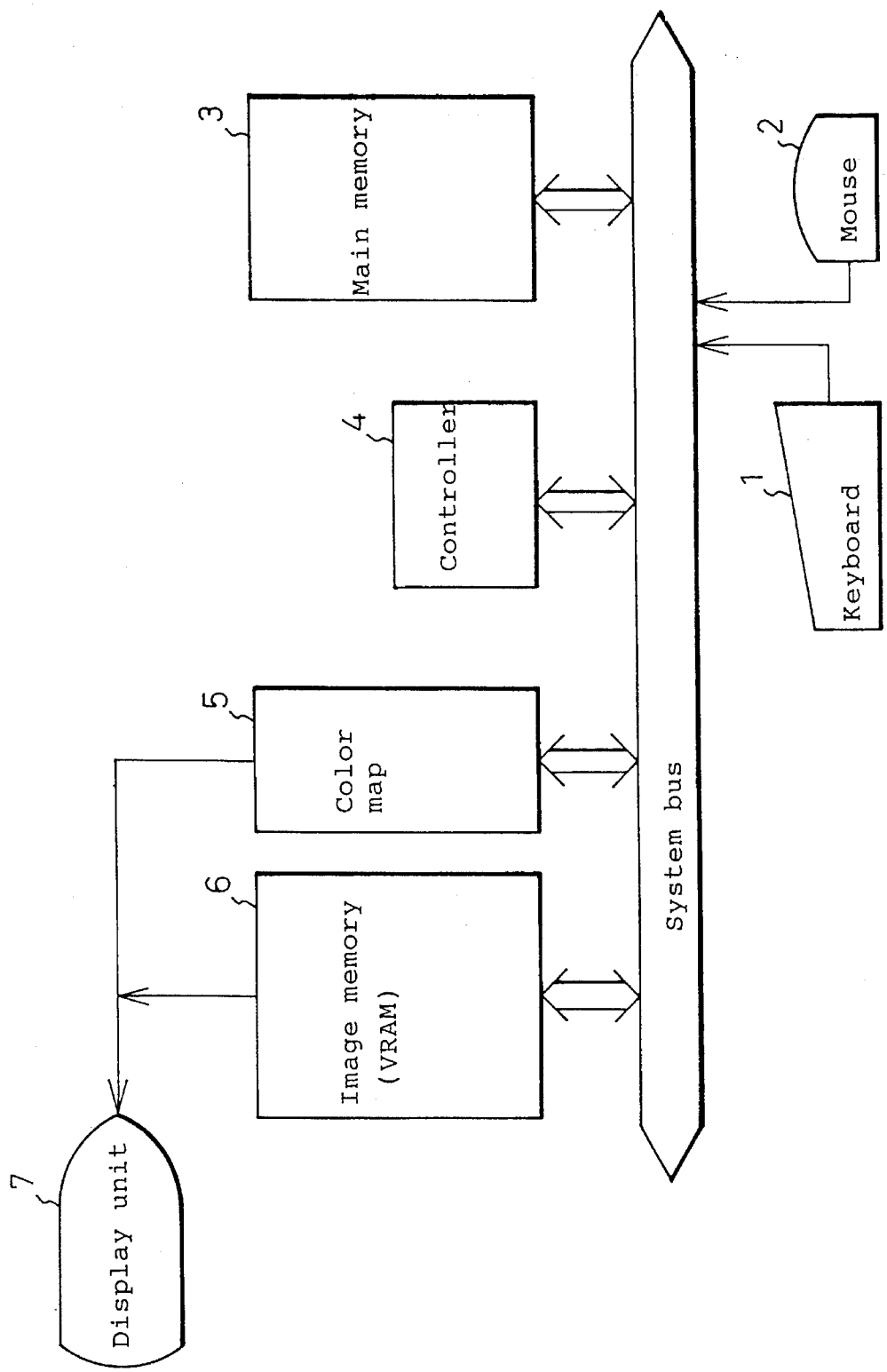
FIG. 1 shows essential parts of a standard graphic display system.

FIG. 1 shows essential parts of a graphic display system. Numeral 1 is a keyboard and 2 is a mouse, which serve as input devices to be operated by an operator to enter instructions and data. Other input devices and pointing devices are also employable.

Numeral 3 is a main memory for storing image data for respective colors R, G, and B, a correspondence table of luminance and color resource IDs, etc. As will be explained later, the contents of the main memory 3 differ from those of the present invention. Numeral 4 is a controller for acquiring color resources and preparing correspondence tables. Numeral 5 is a color map for storing a correspondence table of color resource IDs and RGB values. Numeral 6 is an image memory, such as a standard VRAM, used when displaying image data on a display unit. The present invention employs such a conventional VRAM. Numeral 7 is the display unit of the graphic display system.

These parts are connected to one another through a system bus, for transfer of instructions and data.

Figure 2:
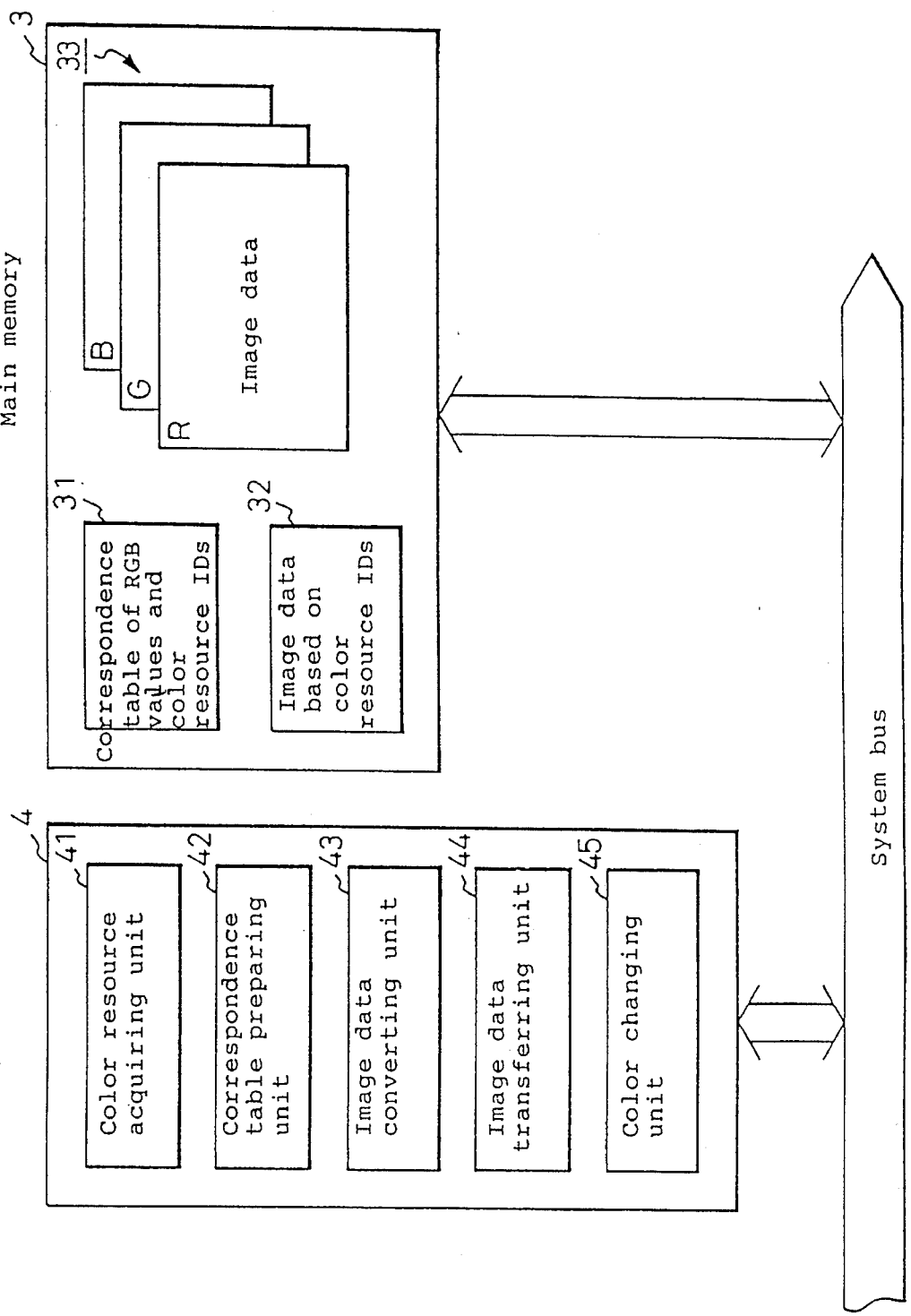
FIG. 2 shows essential parts of a controller and main memory according to a prior art.

FIG. 2 shows essential parts of the controller and main memory. The controller has a color resource acquiring unit 41, a correspondence table preparing unit 42, an image data converting unit 43, an image data transferring unit 44 for transferring image data to the VRAM, and a color changing unit 45.

The main memory 3 has a correspondence table 31 of RGB values and color resource IDs, image data 32 based on color resource IDs, and memory planes 33 for storing image data based on RGB values. As shown in FIG. 10B, the conventional correspondence table 31 of RGB values and color resource IDs assigns R, G, and B values for every color resource ID.

Figure 3:
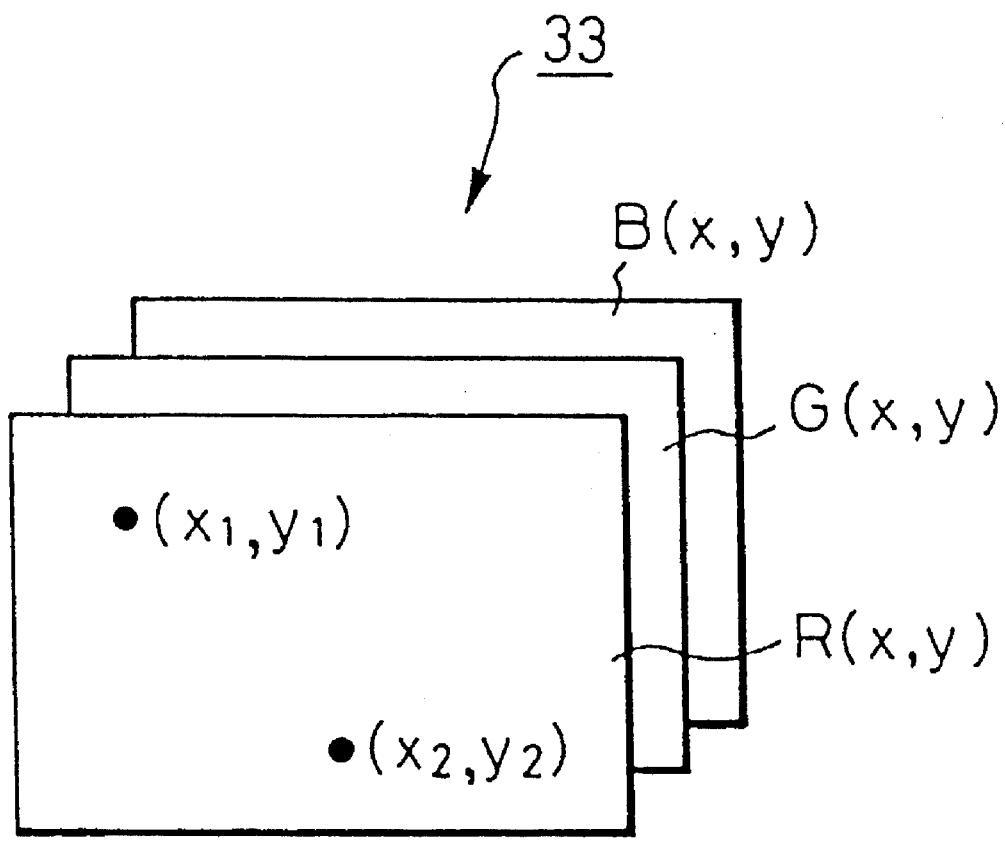
FIG. 3 explains coordinates of image data on memory planes in the main memory of FIG. 2.

FIG. 3 explains coordinates of an image in the main memory of FIG. 2. When storing a color image in the main memory, each memory plane 33 stores the color data (R, G, and B values) of each position of the image. These R, G, and B values are read, overlapped, and output to display the color image. This conventional method of displaying color images stores positional data (x, y) and color data R(x, y), G(x, y), and B(x, y) in each of the memory planes.

Luminance data differ from color to color and from position to position. For example, positions (x1, y1) and (x2, y2) have different luminance data.

Figure 4:
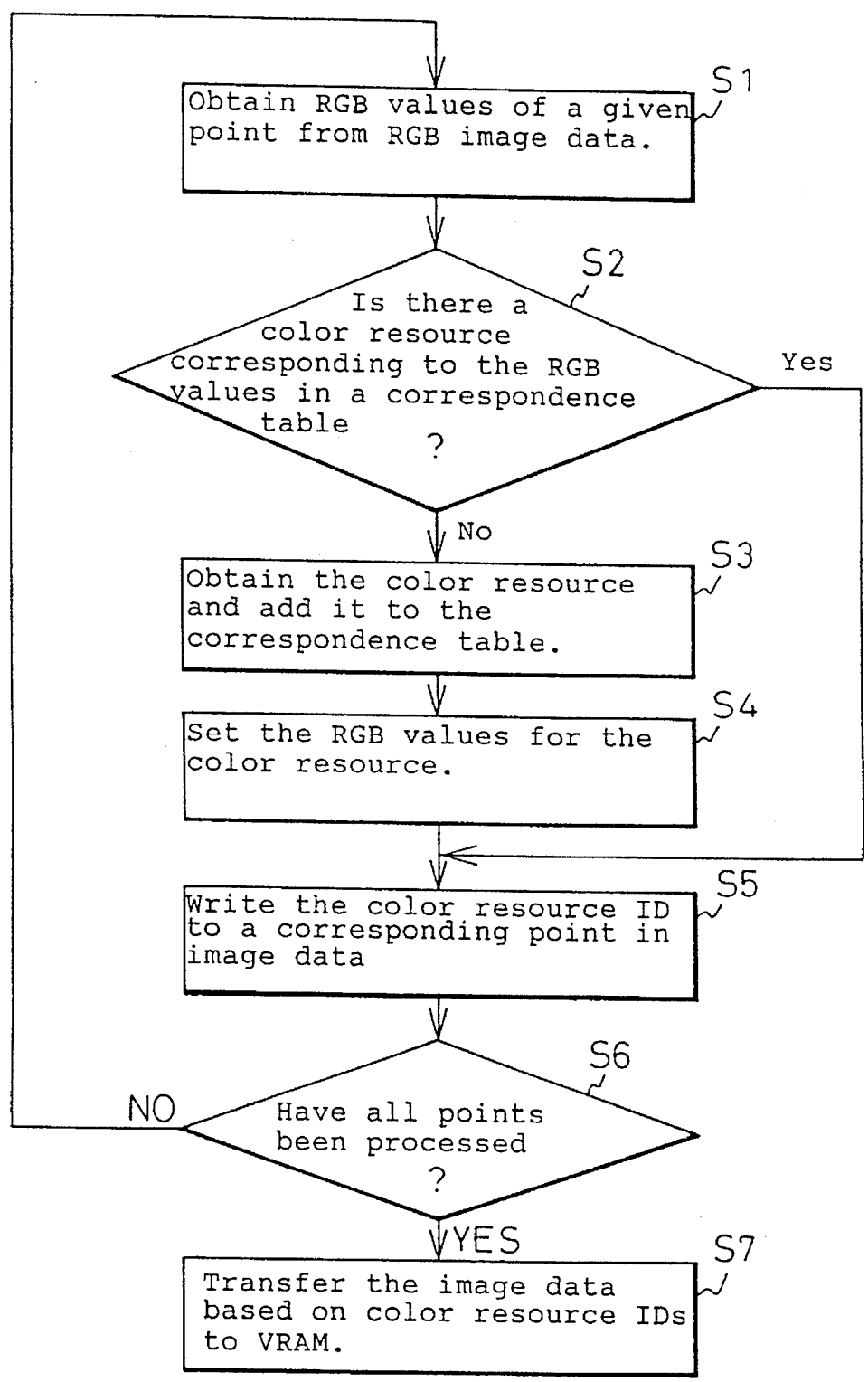
FIG. 4 is a flowchart of image data processing according to the prior art.

FIG. 4 is a flowchart of image data processing according to the prior art, carried out in the color resource acquiring unit 41, correspondence table preparing unit 42, image data transferring unit 44, etc., of the controller 4.

Step S1 obtains RGB values of a given point (position) according to RGB image data in the memory planes 33. Step S2 determines whether or not the correspondence table 31 of RGB values and color resource IDs contains a color resource corresponding to the RGB values obtained in the step S1. If the corresponding color resource is not found, step S3 acquires the color resource and adds it to the correspondence table 31. Step S4 sets the obtained RGB values for the added color resource. Step S5 writes the color resource ID to a corresponding point on the image data based on the color resource IDs. Step S6 determines whether or not all points in the memory planes have been processed. If any point is not processed yet, the process returns to step S1, to repeat the process. If all points have been processed, the image data based on color resource IDs is transferred to the VRAM.

According to this conventional arrangement, the main memory must store an image in each of colors R, G, and B according to the shape of the image. If there are images of red and blue balls having the same shape and different colors, the shape and color data of the two balls must be separately stored for each of the colors R, G, and B. Namely, the main memory must have memory spaces for separately storing the data of the two images.

In this way, the prior art stores images having the same shape and different colors, or the same color and different shapes as separate color and positional data in the main memory. Accordingly, even images having the same shape and different colors, or the same color and different shapes, need large memory spaces.

When changing the color of a ball from blue to red, the prior art must update RGB image data of the ball, acquire new color resources for the updated data, and convert the resources into an image of the ball. This complicated process reduces the system processing speed.

An object of the present invention is to provide a graphic coloring system that separately stores the shape (positional data) and colors of an image in main memory and combines these data. The present invention provides optional images having the same shape (i.e., an desired one of variable, random images) and different colors, or the same color and different shapes, at high speed by changing a combination of shapes and colors of images.

Compared with the prior art, the present invention is able to store images having the same shape and different colors, or the same color and different shapes in a smaller space in main memory, as well as displaying the images with different colors at high speed.

The present invention will be explained with reference to the drawings.

Figure 5:
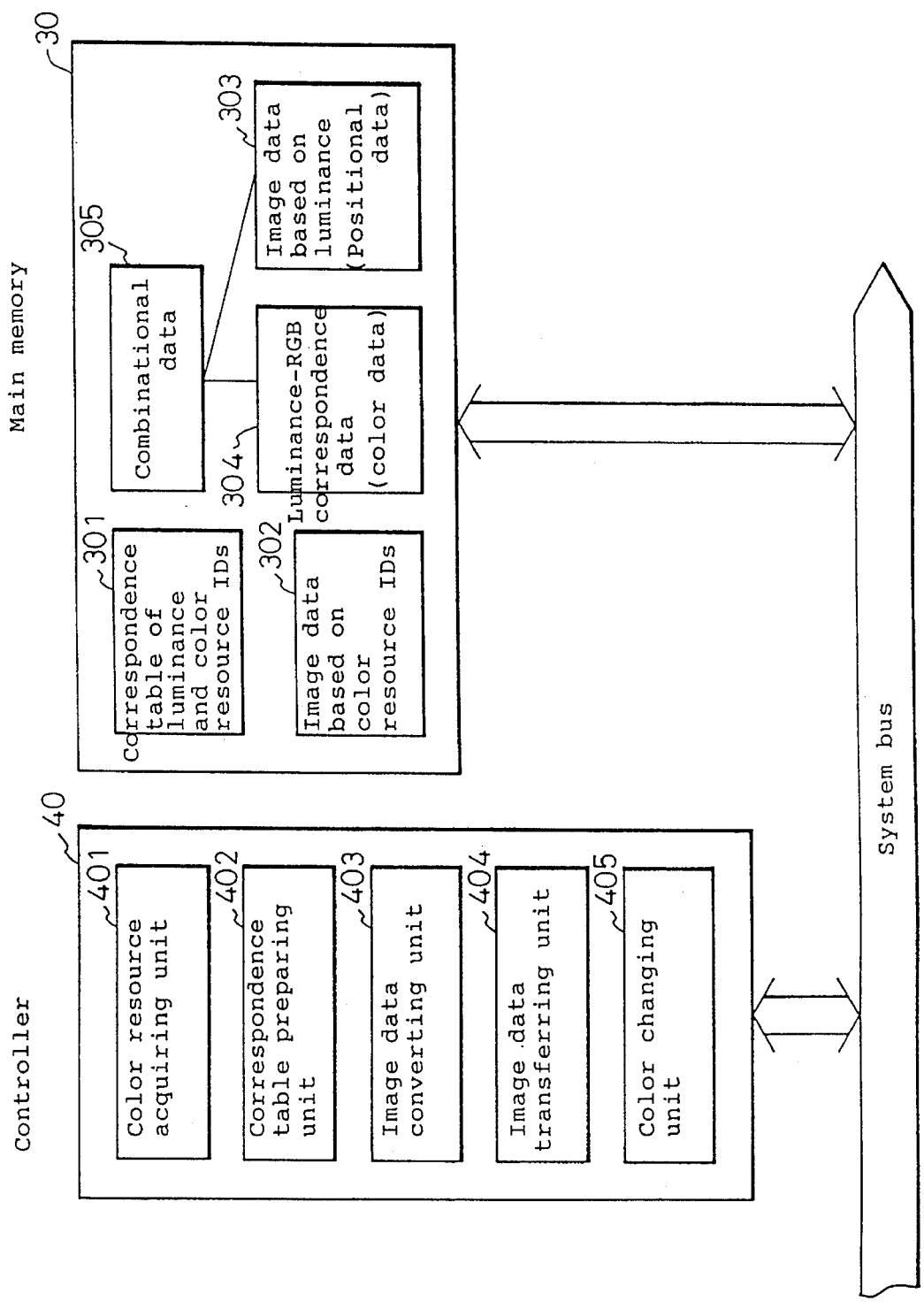
FIG. 5 shows essential parts of a controller and main memory according to the present invention.

FIG. 5 shows essential parts of a controller and main memory according to the present invention. The controller 40 has a color resource acquiring unit 401, a correspondence table preparing unit 402, an image data converting unit 403, an image data transferring unit 404 for transferring image data to a VRAM, and a color changing unit 405. The units 402 to 405 have the same names as those of units 41 to 45, respectively, in FIG. 2 but provide different functions. The color resource acquiring unit 401 and image data transferring unit 404, however, provide the same functions as those of FIG. 2.

The main memory 30 has a correspondence table 301 of luminance and color resource IDs, image data 302 based on color resource IDs, luminance-position image data 303, luminance-color (RGB) correspondence data 304, and combinational data 305 of the luminance-position and luminance-color data.

The present invention prepares optional images having the same shape and different colors, or the same color and different shapes by changing a combination of shapes and colors according to the combinational data 305. The luminance-color data is represented with linear functions, or is provided as a table in advance, as will be described later. Accordingly, the present invention is able to reduce the quantity of image data in main memory to less than that of the prior art.

Figure 6:
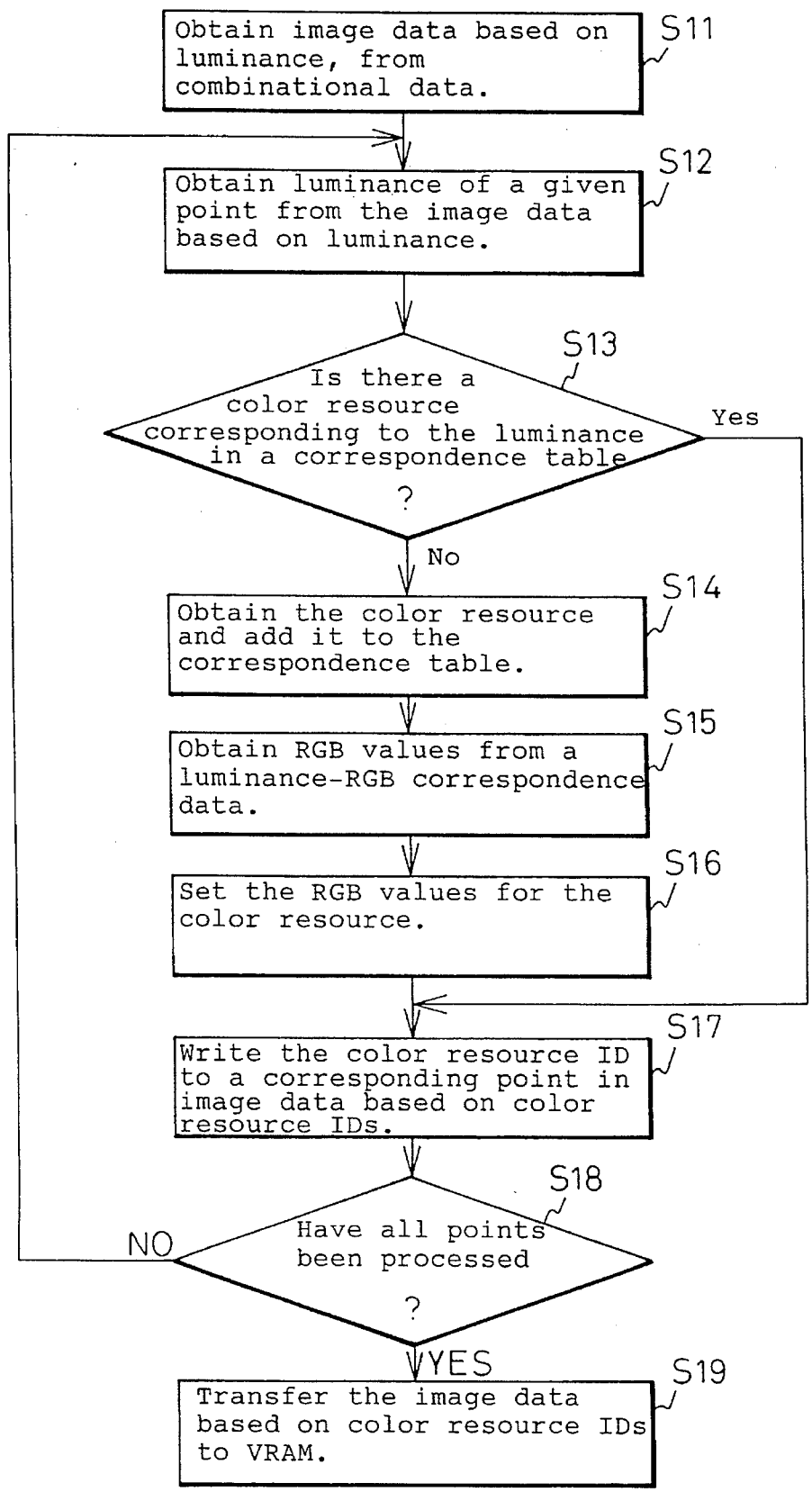
FIG. 6 is a flowchart of processes according to the present invention.

FIG. 6 is a flowchart of processes, according to the present invention, carried out by the controller 40. Step S11 obtains luminance-position image data according to the combinational data 305. Step S12 obtains the luminance of a given point (position) according to the luminance-position image data. Step S13 determines whether or not the correspondence table 301 of luminance and color resource IDs contains a color resource corresponding to the luminance. If the correspondence table does not contain the color resource, step S14 acquires the color resource and adds it to the correspondence table.

Step S15 obtains R, G, and B values according to the luminance-color data. Step S16 sets the R, G, and B values for the color resource. Step S17 writes the color resource ID of the acquired resource to a corresponding point in image data based on color resource IDs. Step S18 determines whether or not all points have been processed. If not, the process returns to the step S1 to repeat the process. Step S19 transfers the image data based on color resource IDs to the VRAM.

In this way, the present invention stores image data in the main memory with a combination of luminance-position data and luminance-color data, so that the main memory can store various images having the same shapes and colors in a minimum space.

The present invention employs the correspondence table of luminance and color resource IDs, so that, when changing colors, it is only necessary to change the color map 5 of FIG. 1 without again acquiring color resources. This results in a greatly improved processing speed.

Figure 7:
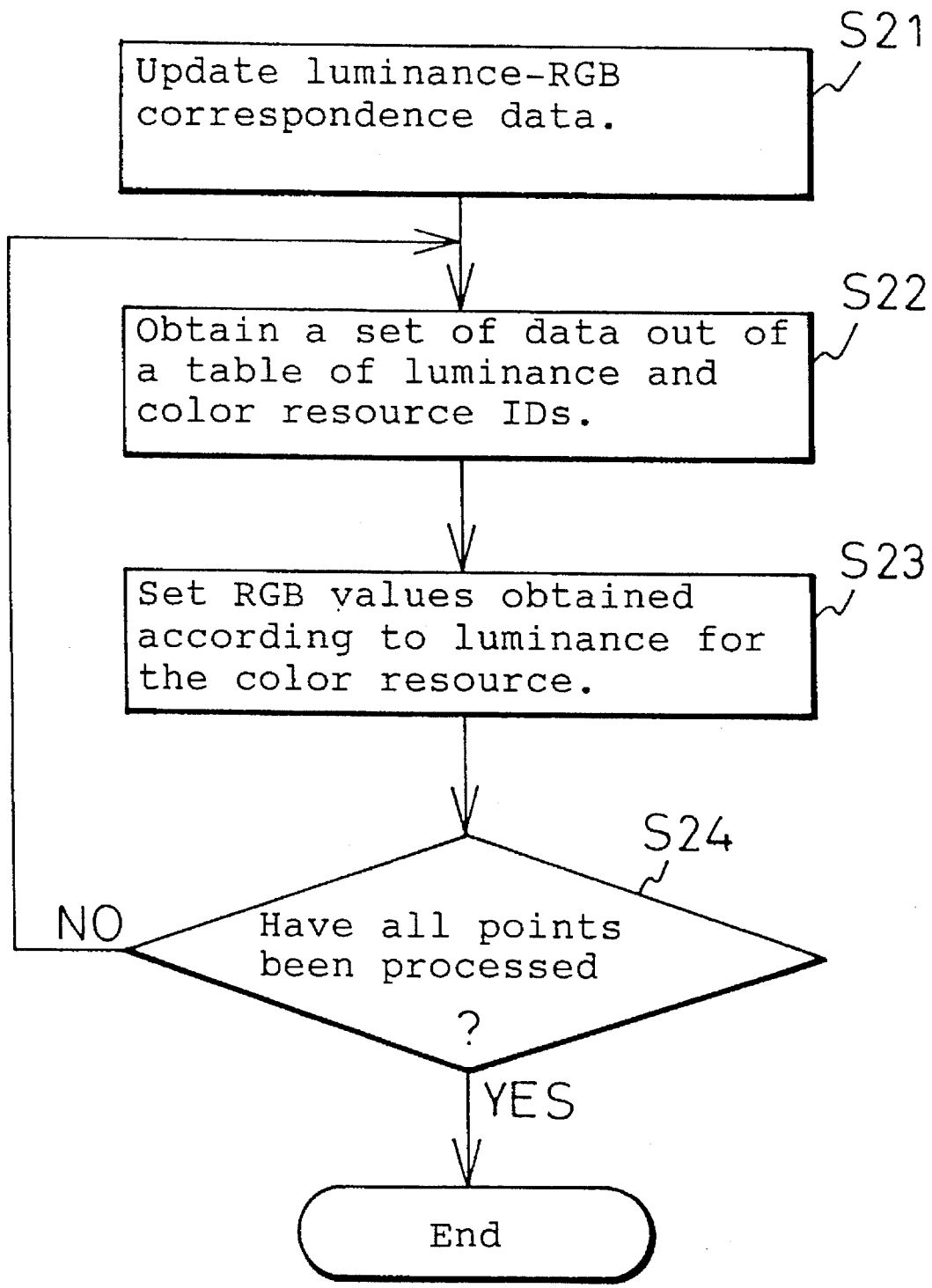
FIG. 7 is a flowchart of color changing processes.

FIG. 7 is a flowchart of a color changing process according to the present invention. Step S21 changes i.e., updates luminance-color correspondence data, i.e., RGB values. Step S22 obtains a set of data out of the correspondence table 301 of luminance and color resource IDs. Step S23 sets R, G, and B values obtained according to the luminance, for the color resource. Step S24 determines whether or not all data have been processed. If not, the process returns to the step S22 to repeat the process. If all data have been processed, the color changing process ends.

Figure 8A:
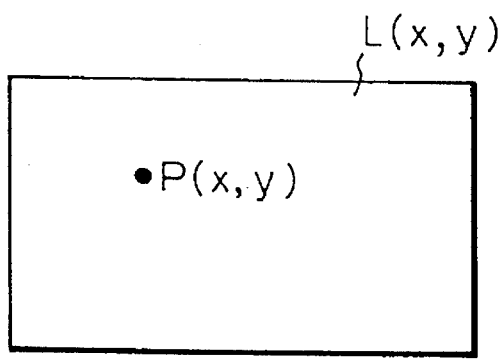
FIG. 8A explains luminance-position data.
Figure 8B:
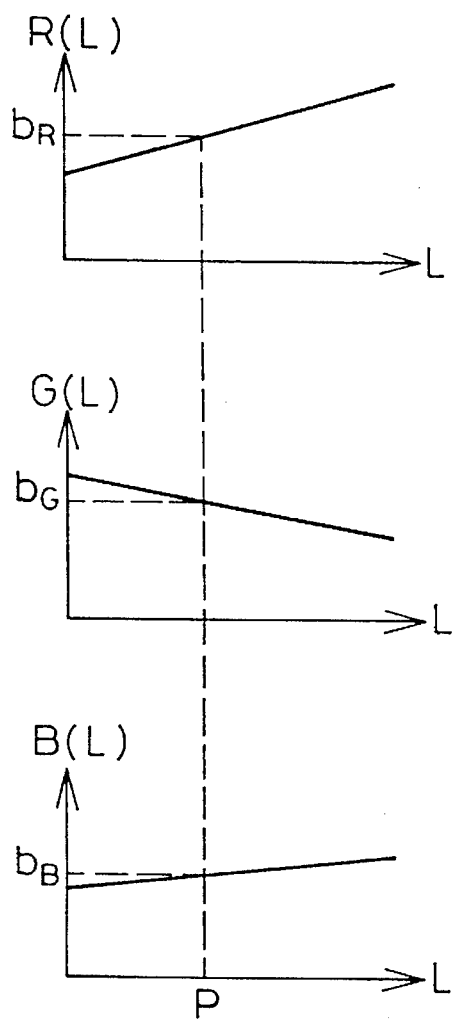
FIG. 8B explains luminance-color (RGB) data.

FIG. 8A explains the luminance-position data, and FIG. 8B explains the luminance-color data. In FIG. 8A, a position P(x, y) has luminance L. This format is stored as the luminance-position data 303 of FIG. 5.

In FIG. 8B, an ordinate indicates one of the R, G, and B data, and an abscissa indicates luminance. This format is stored as the luminance-color correspondence data 304 of FIG. 5. In each coordinate system, a straight line represents a linear function indicating relationships between luminance and RGB data. Namely, RGB data are obtained from relationships R(L), G(L), and B(L) between luminance L(x, y) and R, G, and B values. For example, RGB data for a position P(x, y) are expressed as follows:

$$R(x, y)=R(L(x, y))$$

$$G(x, y)=G(L(x, y))$$

$$B(x, y)=B(L(x, y))$$

The R, G, and B data are overlapped according to the combinational data 305 of FIG. 5, to display a color image. The above linear functions have been empirically obtained by the inventors through tests. A user may determine the inclinations and intercepts $b_R$, $b_G$, and $b_B$ to ordinates of linear functions through tests.

Figure 9A:
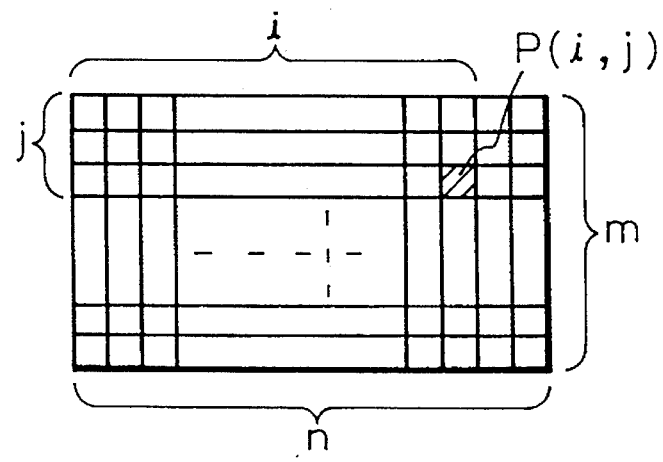
FIGS. 9A and 9B explain gray scale images of luminance-position data.
Figure 9B:
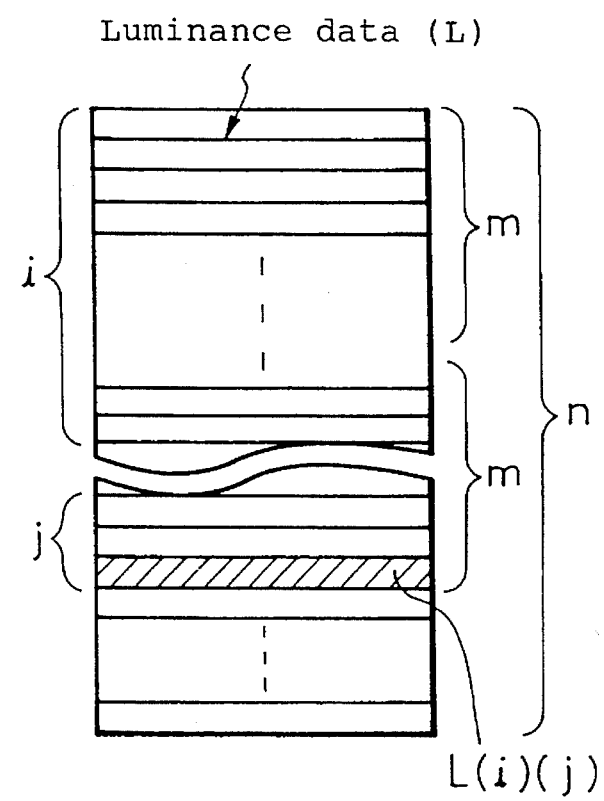

FIGS. 9A and 9B are gray scale images explaining the luminance-position data. FIG. 9A shows the details of FIG. 8A. There are "m×n" pixels having sequential levels of luminance on the gray scale image. The position of a given level of luminance is expressed as P(i, j). FIG. 9B shows an array of pixels on the gray scale image. This array corresponds to the luminance-position data 303. Each row of the array contains the luminance data of a corresponding pixel. A hatched row L(i)(j) corresponds to the position P(i, j) in FIG. 9A.

FIGS. 10A and 10B explain the correspondence tables of luminance and color resource IDs, in which FIG. 10A is the correspondence table 301 of FIG. 5 of the present invention, and FIG. 10B is that of the prior art.

In FIG. 10A of the present invention, as many color resource IDs and corresponding luminance levels as possible are acquired in advance. For example, a color resource ID "XX" corresponds to a luminance level L(X). In this way, as many color resources as possible are allocated for luminance levels in advance. When acquiring color resources from the display unit, the present invention adds any color resource that is not in the display unit to the correspondence table 301 of FIG. 5.

On the other hand, the prior art of FIG. 10B sets each of the R, G, and B values for every color resource ID. For example, R, G, and B values x, y, and z are assigned for a color resource "XX."

Figures 11A, 11B:
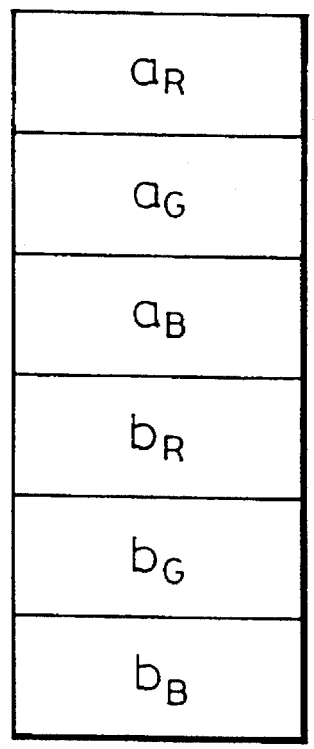
FIGS. 11A and 11B explain luminance-color data.

FIGS. 11A and 11B explain the luminance-color data. These figures explain the linear functions of FIG. 8B in detail and show R, G, and B values for luminance L. In FIG. 11A, $a_R$, $a_G$, and $a_B$ represent inclinations of straight lines of the respective colors, and $b_R$, $b_G$, and $b_B$ represent intercepts of the straight lines to ordinates. These values are stored as luminance-color (RGB) data. FIG. 11B shows straight lines representing relationships between luminance and R, G, and B data and corresponding to the straight lines of FIG. 8B, respectively.

Figure 12:
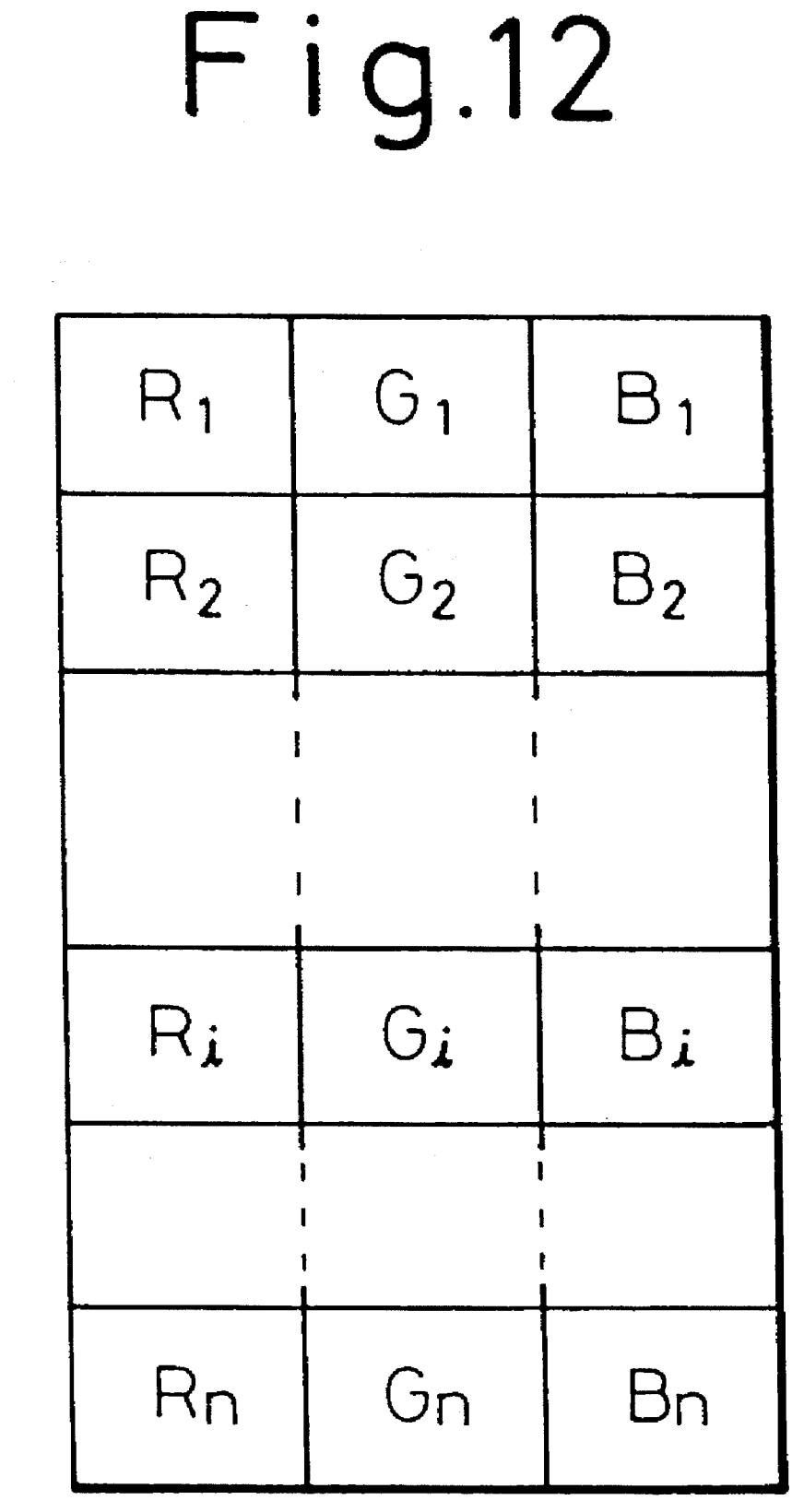

FIG. 12 shows another example of the luminance-color data. This example does not employ the linear functions of FIGS. 8B and 11B. Instead, it provides "i"th color values Ri, Gi, Bi for a given luminance level "i." Namely, this example stores R, G, and B values in the order of luminance levels on a gray scale image, and provides corresponding R, G, and B values in response to a given luminance level.

Figure 13:
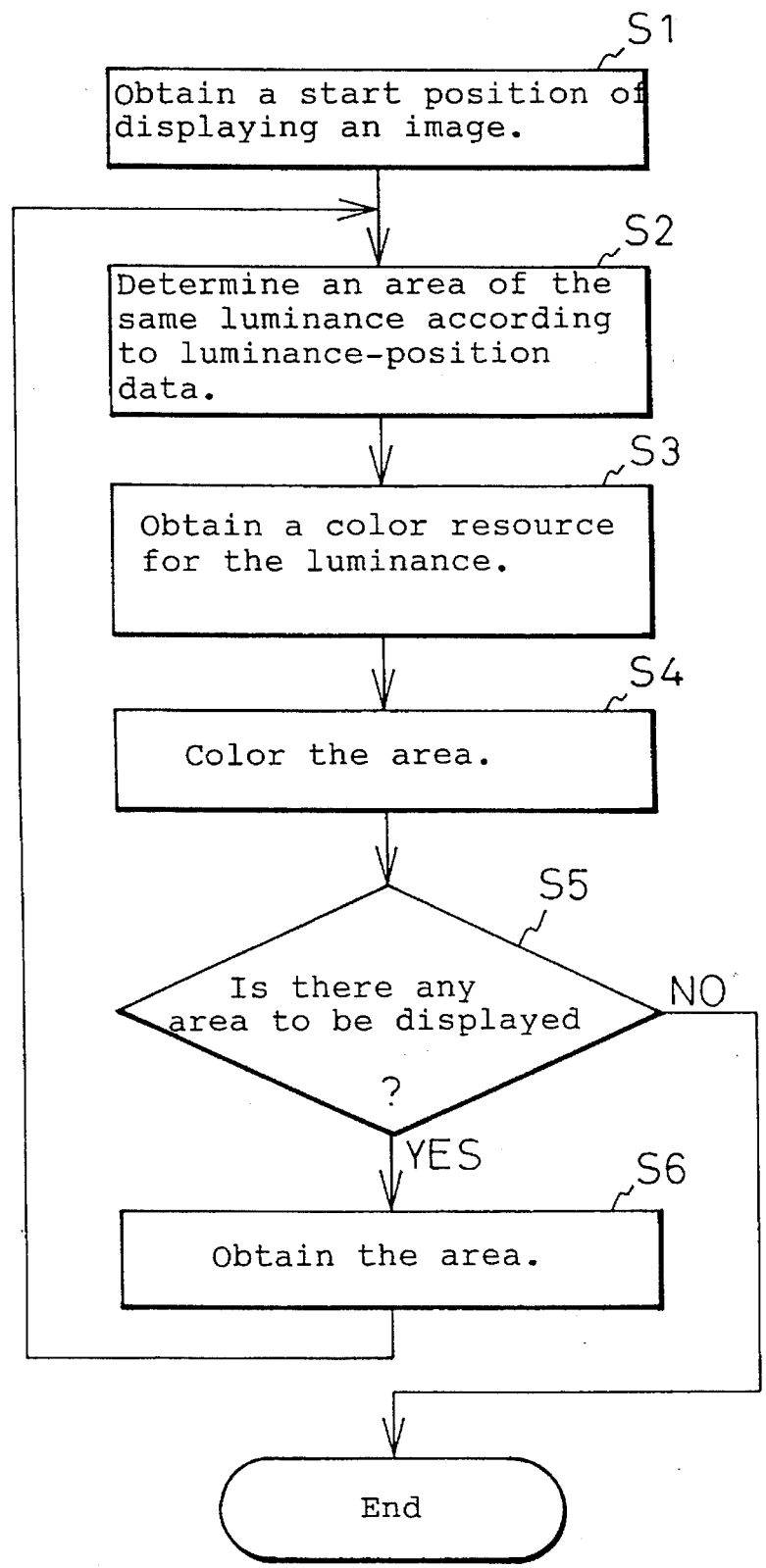
FIG. 13 is a flowchart of basic processes of preparing image data.

FIG. 13 is a flowchart showing basic processes of image data preparation. Step S1 specifies a start position of displaying an image. Step S2 finds an area having the same luminance level according to the luminance-position data. Step S3 refers to the correspondence table of luminance and color resource IDs, to acquire a color resource for the luminance. Step S4 colors the area according to the acquired data.

Step S5 determines whether or not there is any area to be displayed. Step S6 obtains the area to be displayed, if any, to repeat the steps S2 to S6. If there is no area to be displayed in Step S5, the preparation of image data ends.

A graphic display system according to the present invention separately stores the shape (positional data) and colors of an image in a main memory. The present invention provides optional images of the same shape and different colors, or the same color and different shapes, at high speed by changing a combination of the shapes and colors of images according to combinational data of shapes and colors. The present invention stores images having the same shapes and different colors, or the same color and different shapes, in a minimum space in the main memory. The present invention is capable of displaying these images and changing their colors at high speed. The graphic display system according to the present invention is particularly effective for use as, for example, a graphic editor, etc., that requires correct combinations of colors.

I claim:

1. A graphic display system having a display unit and selectively producing images, variously of the same shape and different colors and of the same color and different shapes, for display on the display unit and comprising:

a main memory storing:

a correspondence table of luminance values and color resource identifiers, image data based on color resource identifiers, luminance-position data, luminance-color correspondence data, and combinational data of the luminance-position data and luminance-color data;

a controller;

a system bus interconnecting the controller, the main memory, the image memory and the display unit; and the controller accessing the main memory through the system bus:

to obtain luminance-position image data in accordance with the combinational data, to obtain the luminance of a given position in the image in accordance with the luminance-position image data, to determine whether or not the correspondence table of luminance and color resource identifiers contains a color resource corresponding to the luminance for the given position, and if the correspondence table contains the color resource, to obtain color values from the luminance-color correspondence data thereupon to write the color resource identifier to a corresponding point in the image data based on color resource identifiers but, if the correspondence table does not contain the color resource, then, to obtain the color resource and add it to the correspondence table to obtain color values from the luminance-color correspondence data and to set the color values for the color resource, and the controller continuing the above steps until all positions in the image have been processed, thereupon to transfer the image data based on color resource identifiers to a video random access memory to be accessed for producing an image display on the display unit.

2. The graphic coloring system according to claim 1, wherein the luminance-position data stored in the main memory comprises staged luminance levels based on a gray scale image.

3. The graphic coloring system according to claim 1, wherein the luminance-color data (304) expresses tricolor, R, G and B data as linear functions of luminance, and provides color data according to the linear functions and the luminance-position data.

4. The graphic coloring system according to claim 1, wherein the luminance-color data is prepared by obtaining R, G, and B values for each luminance level in advance.

* * * * *